SHOGREN & ADAMS.
Tire Setter.

No. 103,669.

Patented May 31, 1870.

Witnesses:
R. Sibley
Henrich F. Bruns

Inventors
Andrew Shogren
Henry A. Adams
by L. L. Coburn

United States Patent Office.

ANDREW SHOGREN AND HENRY A. ADAMS, OF SANDWICH, ILLINOIS.

Letters Patent No. 103,669, dated May 31, 1870.

IMPROVEMENT IN TIRE-SETTING MACHINES.

The Schedule referred to in these Letters Patent and making part of the same.

We, ANDREW SHOGREN and HENRY A. ADAMS, of Sandwich, in the county of De Kalb and State of Illinois, have invented a new and useful "Improvement in Tire-Setting Machines," of which the following is a specification, reference being had to the accompanying drawings, which form a part thereof.

The Object and Nature of our Invention.

The object of our invention is to make a machine that clasps the tread of the wheel and compresses it, bringing all its joints compactly together, and crowning it as much as may be required, so that the tire can be placed upon it with little or no heating.

We save the expense of heating the tire to a high temperature and the injury frequently done a wheel by placing upon it a tire so heated.

We can also secure a more perfect shape to the wheel than when the tire is sufficiently heated to conform to the irregularities of the circumference of the wheel, and we can set the tires much quicker.

The nature of our invention, to accomplish the above objects, consists in the clamps for clamping or clasping the tread of the wheel, and also in the combination of levers for operating said clamps, and also the combination with the clamps of the guides and supports, as hereafter more fully described.

General Description.

The same letters of reference refer to the corresponding parts in the different figures.

A represents the frame or bed-piece of the machine supported upon legs B.

C is a circular piece rigidly attached to the frame A, and

D are guides extending through the circular piece C, forming a part of it, to make the circle continuous.

E are clamps for clamping the wheel, as hereafter described, and we usually make them in segments, as shown.

When in position in the machine for use, they rest upon the circular piece C and guides D, the piece F resting in the groove H.

It will be observed that the piece F is attached to the under side of the clamps, or it may be made a part of the clamps, just wide enough to play in the grooves H, and guide the clamps, when operated, toward the center of the wheel.

I is a square shoulder on the clamps E which clasp over the lower edge of the felly J of the wheel, so that when the clamps are drawn toward the center of the machine, as hereafter described, the pressure is thrown upon the felly of the wheel and all the joints of the wheel are closed and the wheel compressed to the circumference necessary to receive the tire and give to the wheel the proper crown or disk. The tire is then placed upon the wheel and forced upon the felly as far as the shoulders I of the clamps E.

K are rods connecting each of the clamps to the lever L, which has its fulcrum on the center pin O.

The rods K are so connected with the lever L that when it is vibrated it moves all the clamps E toward the center of the machine, and all the same distance, so that the pressure is uniform around the entire circumference of the wheel.

P is also a lever with its fulcrum at Q, and its short end is attached to the lever L.

R is a pawl which falls in the cogs S and holds the lever in position as the wheel is clamped.

T are clasps attached to the machine in suitable places to be turned over the tire and hold it upon the wheel on one side while it is being drawn upon the wheel on the other side.

Figure 1:
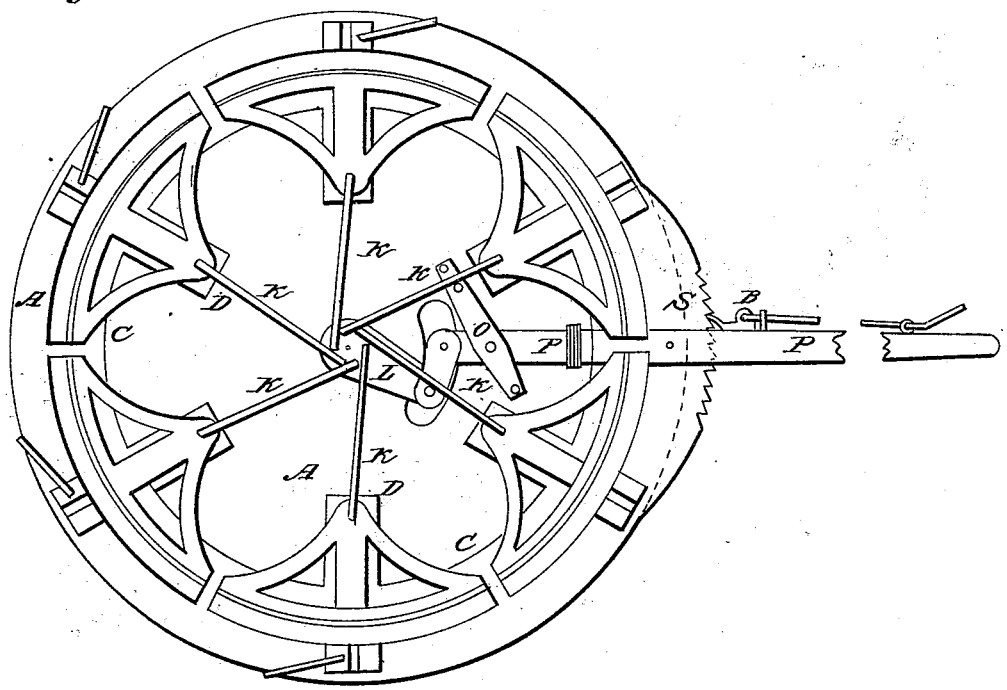
Figure 1 represents a top or plan view of our machine.
Figure 2:
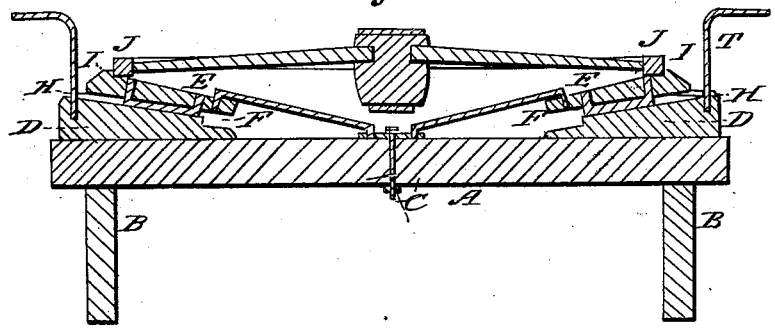
Figure 2, a vertical sectional view at the line $x\ x$ in fig. 1.

To operate our machine, the operator throws back the lever P, which, through the action of the lever L and rods K, slides the clamps E back in the grooves H, and they are ready to receive a wheel, as shown in fig. 2.

The operator then moves the lever P, and through the lever L and rods K, moves the clamps toward the center of the wheel, the shoulders I clasping the felly of the wheel and compressing it together.

The pawl R holds the lever P at any desired position, so that the operator, when he has clamped the wheel, can then take the tire and place it upon the wheel, and if it goes a little tight so that it is necessary to work down one side at a time, the clasps T are turned over the side that is worked down to hold it on the wheel while the operator is working down the tire on the other side of the wheel.

When the tire is put upon the wheel down to the shoulders I, the wheel is taken from the machine, turned over, and placed upon an anvil or other suitable place, and the felly forced entirely and evenly within the tire.

Tires can be set rapidly with our machine.

It will be observed that clamps of various shapes could be used, and also that it would not be necessary to have a continuous shoulder, I, as various devices for clamping the wheel could be used.

Claims.

We claim—

1. The clamps E for the purpose of clasping the felly of a wheel and clamping the wheel, when constructed and operating substantially as specified and shown.

2. The levers P and L, the connecting-rods K, and clamps for clamping the wheel, when constructed and operating substantially as shown.

3. The clamps E and guides D in a tire-setting machine, for guiding the clamps, substantially as and for the purposes specified.

ANDREW SHOGREN.
HENRY A. ADAMS.

Witnesses:
S. B. STINSON,
JOHN W. CASS.